(12) United States Patent
Ayrapetian et al.

(10) Patent No.: US 9,787,825 B1
(45) Date of Patent: Oct. 10, 2017

(54) CYCLICALLY VARIABLE SIGNAL DELAYS FOR ACOUSTIC ECHO CANCELLATION

(71) Applicant: Amazon Technologies, Inc., Seattle, WA (US)

(72) Inventors: Robert Ayrapetian, Morgan Hill, CA (US); Arnaud Jean-Louis Charton, Livermore, CA (US); Yuwen Su, Cupertino, CA (US); Michael Alan Pogue, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/788,032

(22) Filed: Jun. 30, 2015

(51) Int. Cl.
*H04M 9/08* (2006.01)
*H04M 3/00* (2006.01)

(52) U.S. Cl.
CPC .................... *H04M 3/002* (2013.01)

(58) Field of Classification Search
CPC .. H04R 3/02; G10K 11/16; H04B 3/23; H04S 1/00; H04M 9/082; H04M 3/002
USPC ..... 381/300, 71.11, 71.12, 94.7; 379/406.03, 379/406.06
See application file for complete search history.

(56) References Cited

U.S. PATENT DOCUMENTS

| | | | |
|---|---|---|---|
| 2005/0169459 A1* | 8/2005 | Marton | H04M 9/082 379/406.15 |
| 2009/0304198 A1* | 12/2009 | Herre | G10L 19/008 381/66 |

OTHER PUBLICATIONS

Joncour, "A Stereo Echo Canceler with Pre-Processing for Correct Echo-Path Identification", IEEE, C&C Media Research Laboratories, NEC Corporation, Japan, 3677-3680, 1998.
Sugiyama, et al. "A Stereo Echo Canceler with Correct Echo-Path Identification Based on an Input-Sliding Technique", IEEE Transactions on Signal Processing, vol. 49, No. 11, Nov. 2001, 11 pages.

\* cited by examiner

*Primary Examiner* — Alexander Jamal
(74) *Attorney, Agent, or Firm* — Lee & Hayes, PLLC

(57) ABSTRACT

A multi-channel audio communication system is configured to receive highly correlated input audio signals, generated as an example by multiple microphones at a far-end site. Each input audio signal is cyclically stepped through a range of discrete delay amounts, between upper and lower limits, using a step size that is a fraction of the sample period of the input audio signals. Delay cycles applied to the different input audio signals are configured to have different phases, thereby reducing the inter-signal correlation of the input audio signals. The delayed input audio signals are then played by loudspeakers. Microphone output, which may contain sound generated by the loudspeakers, is then subjected to multi-channel acoustic echo cancellation.

20 Claims, 5 Drawing Sheets

CYCLICALLY VARIABLE SIGNAL DELAYS FOR ACOUSTIC ECHO CANCELLATION

BACKGROUND

Acoustic echo cancellation (AEC) is used in telecommunications devices to improve audio quality. In this environment, an echo is a delayed reoccurrence of an original signal in a received or retransmitted signal. Audio echo is caused by an acoustic echo path between the microphone and loudspeaker of a telecommunications device or system.

AEC is particularly useful in audio conferencing, in which the near-end microphone may pick up and retransmit far-end sounds played by the near-end loudspeaker. AEC components use the loudspeaker signal as a reference to cancel the far-end sounds from the near-end microphone audio signal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
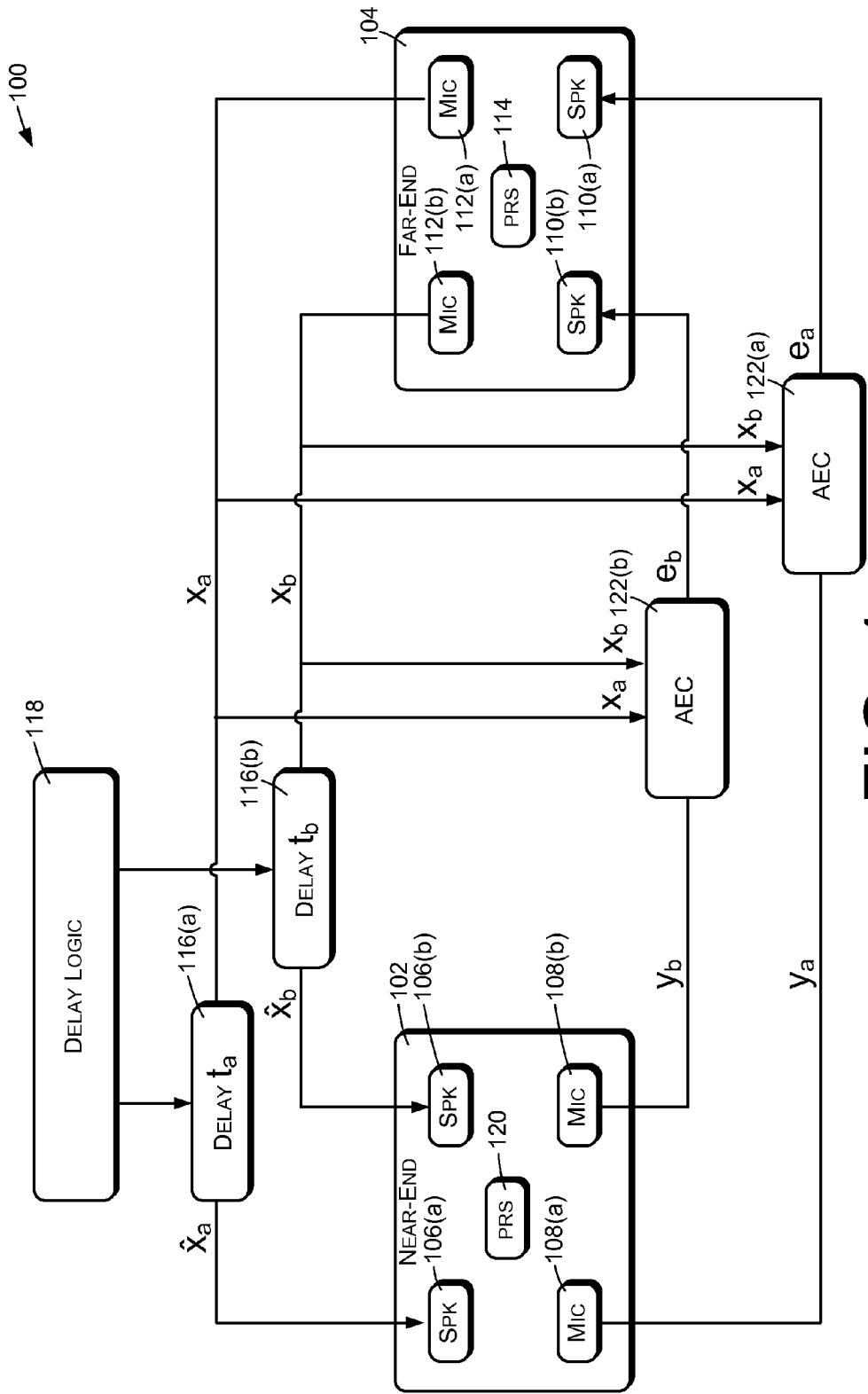
FIG. 1 is a block diagram showing an example teleconferencing environment that uses acoustic echo cancellation.

Described herein are techniques for acoustic echo cancellation (AEC) in a stereo or other multi-channel audio communications environment. In a stereo communications environment, a near-end system may receive left and right far-end audio signals that have been produced by left and right microphones of a far-end system. Each of these far-end audio signals may represent generally the same sound, such as the speech of person at the far-end site, albeit at different volumes and delays. At the near-end, the far-end audio signals are received and rendered by stereo loudspeakers.

The near-end audio system has a microphone that captures near-end sound produced by a person at the near-end site and that provides a near-end output audio signal representing the near-end sound to the far-end system. However, the near-end microphone also picks up far-end sound produced by the near-end loudspeakers. This far-end sound is referred to as echo, and the near-end system attempts to cancel the echo from the near-end output audio signal using AEC. For example, a pair of linear finite-impulse response (FIR) filters may be configured to adaptively estimate the far-end audio components of the near-end microphone audio signal and to subtract those components from the near-end microphone audio signal. However, the near-end microphone audio signal represents multiple audio channels, where the sound corresponding to the channels is highly correlated. Because of the strong inter-signal correlation between the far-end stereo audio signals, AEC may fail to converge or may be slow to converge.

In described embodiments, inter-signal correlation is reduced by introducing cyclically varying delays into one or more of the far-end audio signals. For one of the far-end audio signals, the amount of the variable delay is varied back and forth within a range of delay values, by a step size or adjustment amount that is smaller than or a fraction of the sample period T of the far-end audio signals. For example, the amount of the delay may be repeatedly cycled from 1 T to 2 T and back to 1 T, in step sizes of 0.10 T. A bank of linear FIR filters may be configured as fractional delay filters and selectively applied to the far-end audio signal to produce the delays of the desired amounts.

In certain embodiments, cyclically varying delays may be introduced into each of two stereo far-end audio signals. In this case, the delays of the two signals are varied in opposing cycles, so that one of the delays increases while the other decreases. As an example, the delay amount for the left far-end audio signal may be cycled first up and then down through a range of delay values, while the delay amount for the right far-end audio signal is cycled first down and then up through the same or another range of delay values. This ensures that the delay values vary in respective cycles that are out of phase with each other. Varying the delay values in this manner causes the far-end audio signals to have a continually changing phase relationship, thereby reducing inter-signal correlation.

More generally, in multi-channel systems including two or more far-end audio channels, a cyclically varying delay is introduced into each of the far-end audio signals. The delay for each far-end audio signal is controlled to cycle back and forth through a range of delay values defined by a lower limit and an upper limit. For the different far-end audio signals, the cycles of the delay values configured to be out of phase with each other so that they do not have a time correlation.

Cyclically delaying the far-end audio signals in this manner reduces the correlation between signals in a multi-channel system, which in turn allows AEC components to correctly estimate echo components of near-end microphone signals.

FIG. 1 shows an example environment 100 in which the described techniques may be implemented. In this example, a stereo teleconferencing system is depicted having a near-end system 102 and a far-end system 104. The term "near-end" refers to the site or components whose operations are being described while "far-end" refers to a site or components from which signals are received and to which signals are sent. In practice, the near-end and far-end sites may be configured in the same manner.

The systems 102 and 104 may comprise audio or audio/video conferencing systems in which near-end and far-end conference participants communicate with each other between two sites using audio and video communications. The two systems 102 and 104 may communicate with each other using various types of network communications, including private networks, public networks such as the Internet, or any combination of such networks. Dedicated, point-to-point communication media may also be used to provide data communications between the near-end system 102 and the far-end system 104.

The described techniques may also be used in conjunction with other types of devices and systems, such as hands-free communication devices, headsets, portable phones, speakerphones, any sort of device that use a voice-based user interface, and so forth.

The near-end system 102 has first and second loudspeakers 106(a) and 106(b) and first and second microphones 108(a) and 108(b). The far-end system 104 has first and second loudspeakers 110(a) and 110(b) and first and second microphones 112(a) and 112(b).

The far-end microphones 112(a) and 112(b) produce far-end audio signals $x_a$ and $x_b$, respectively, which are transmitted from the far-end system 104 to the near-end system 102. The far-end audio signals $x_a$ and $x_b$, represent sound generated from the environment of the far-end system 104, such as speech produced by a person or other sound source 114.

The far-end audio signals $x_a$ and $x_b$, as well as other signals discussed herein, are digital audio signals in which sound is represented as streams or sequences of sample values occurring at a frequency that is referred to as a sample frequency or rate, and in which each sample value represents the sound at a corresponding time. For example, the sample rate may be 48 KHz in an audio environment such as illustrated. Each sample value also corresponds to a sample period T, which is the inverse of the sample rate.

The far-end signals $x_a$ and $x_b$ are received by respective variable delay components 116(a) and 116(b). The first delay component 116(a) delays the first far-end signal $x_a$ by a first variable delay value $t_a$, resulting in a delayed first far-end signal $\hat{x}_a$. The second delay component 116(b) delays the second far-end signal $x_b$ by a second variable delay value $t_b$, resulting in a delayed second far-end signal $\hat{x}_b$. The delay values $t_a$ and $t_b$ introduced by the first and second delay components are controlled and cyclically varied in accordance with delay logic 118. The delay logic 118 produces oscillations of the delay values $t_a$ and $t_b$ through corresponding ranges of delay amounts by one or more adjustment amounts that are smaller than the sample period T. The delay logic produces the oscillations so that they have a phase offset relative to each other. For example, the phases of the oscillations may be offset by 180 degrees.

The delayed first far-end signal $\hat{x}_a$ is delayed relative to the first far-end signal $x_a$. More specifically, the delayed first far-end signal $\hat{x}_a$ comprises delayed signal values corresponding respectively to signal values of the first far-end signal $x_a$. While a particular signal value of the first far-end signal $x_a$ represents sound at a particular point in time, the corresponding delayed signal value of the delayed first far-end signal $\hat{x}_a$ represents the sound at a preceding time. The preceding time may be a time that is between times represented by signal values of the first far-end signal $x_a$, and therefore does not correspond directly to one of the signal values of the first far-end signal $x_a$.

The delayed second far-end signal $\hat{x}_a$ is delayed relative to the second far-end signal $x_b$ in a similar manner. Delayed signal values such as this can be calculated using fractional delay finite impulse response filters as will be described in more detail below.

The delayed far-end signals $\hat{x}_a$ and $\hat{x}_b$ are played or rendered by the first and second near-end loudspeakers 106(a) and 106(b), respectively, of the near-end system 102.

The near-end microphones 108(a) and 108(b) produce near-end microphone audio signals $y_a$ and $y_b$, respectively.

The near-end microphone audio signals $y_a$ and $y_b$ represent sound generated from the environment of the near-end system 102, such as speech produced by a person or other near-end sound source 120. In addition, each near-end audio signal $y_a$ and $y_b$ may represent components of the far-end sound, produced by the near-end loudspeakers 106(a) and 106(b) based on the delayed far-end audio signals $\hat{x}_a$ and $\hat{x}_b$.

AEC components 122(a) and 122(b) are applied respectively to each of the near-end microphone audio signal $y_a$ and $y_b$ to cancel or partially cancel any representations of the far-end sound that are present in the near-end microphone audio signals $y_a$ and $y_b$. Each of the AEC components 122(a) and 122(b) receives the far-end audio signals $x_a$ and $x_b$, which are used as references for estimating one or more echo components of the near-end microphone audio signals $y_a$ and $y_b$. The AEC components 122(a) and 122(b) produce echo-cancelled output audio signals $e_a$ and $e_b$, respectively, which are played or rendered by the far-end loudspeakers 110(a) and 110(b). Note that the AEC filters 122(a) and 122(b) may also, or alternatively, use the delayed far-end audio signals $\hat{x}_a$ and $\hat{x}_b$ as reference signals.

Figure 2:
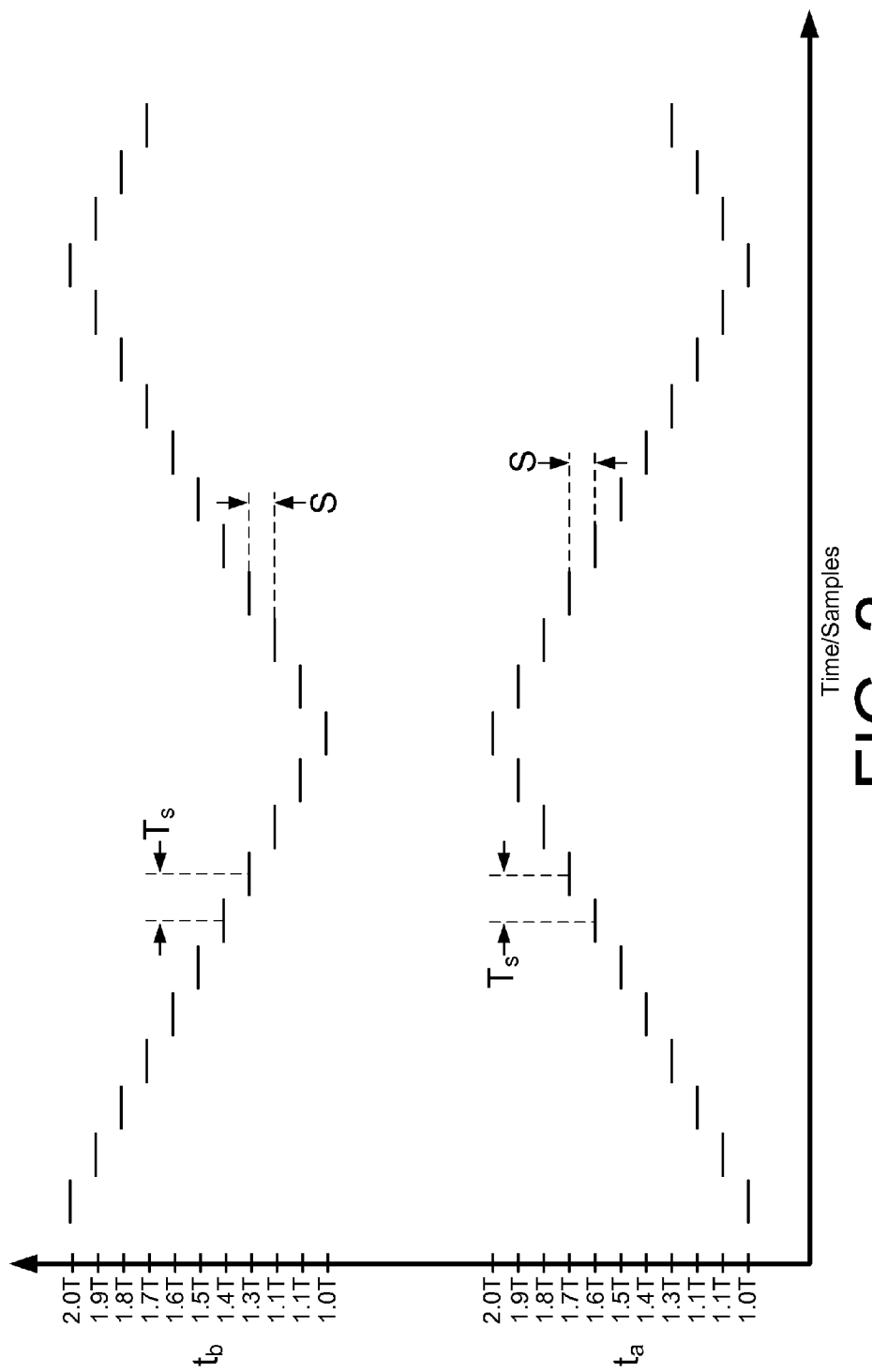
FIG. 2 is a graph illustrating an example of how first and second far-end signals may be delayed in the environment of FIG. 1.

FIG. 2 shows an example of how the delay logic 118 may vary the delay values $t_a$ and $t_b$ in the stereo system of FIG. 1. In FIG. 1, the horizontal axis represents time, which also corresponds to the number of transmitted and received samples of the far-end audio signals $x_a$ and $x_b$. The vertical axis represents the delay values $t_a$ and $t_b$. The first delay value $t_a$ is shown in the lower part of the figure and the second delay value $t_b$ is shown in the upper part of the figure. In this example, both of the delay values $t_a$ and $t_b$ are stepped back and forth between lower and upper limits of a delay value interval or range using a step size S, where the step size S is smaller than or is a fraction of the sample period T, and the delay values $t_a$ and $t_b$ are stepped in opposite directions at any given time. That is, the first delay value $t_a$ is stepped upwardly while the second delay value $t_b$ is stepped downwardly, and vice versa. More specifically, the first delay value $t_a$ is stepped upwardly from the lower limit of the delay value range to the upper limit of the delay value range and then back downwardly to the lower limit. Concurrently, the second delay value $t_b$ is stepped downwardly from the upper limit of the delay value range to the lower limit of the delay value range and then back upwardly to the upper limit.

In this example, the lower limit of the delay range is 1.0 T and the upper limit is 2.0.T, corresponding to a range of 1.0 T. However, the delay value range may comprise any integer or non-integer multiple of the sample period T. Furthermore, each of the delay values $t_a$ and $t_b$ may in certain embodiments be stepped through respectively unique delay value intervals. For example, the first delay value $t_a$ may be stepped through an interval of 0.0 T through 1.0 T while the second delay value $t_b$ is stepped through an interval of 1.0 T through 2.0 T. The ranges may overlap in some implementations or may be exclusive in other implementations.

The step size S in this example is 0.1 T, and the same step size is used for stepping each of the delay values $t_a$ and $t_b$. In some embodiments, different step sizes may be used for different audio signals.

The rate at which the delay values are stepped may be established as appropriate for a particular application. As one example, for the sampling rate of 48 KHz, the delay values may be changed every $T_s$ samples, where $T_s$ equals 40 samples. This corresponds to a step rate of $1/T_s$. In implementation, the delay values may be changed for every frame of audio samples, for every two frames, or any other number of frames.

Figure 3:
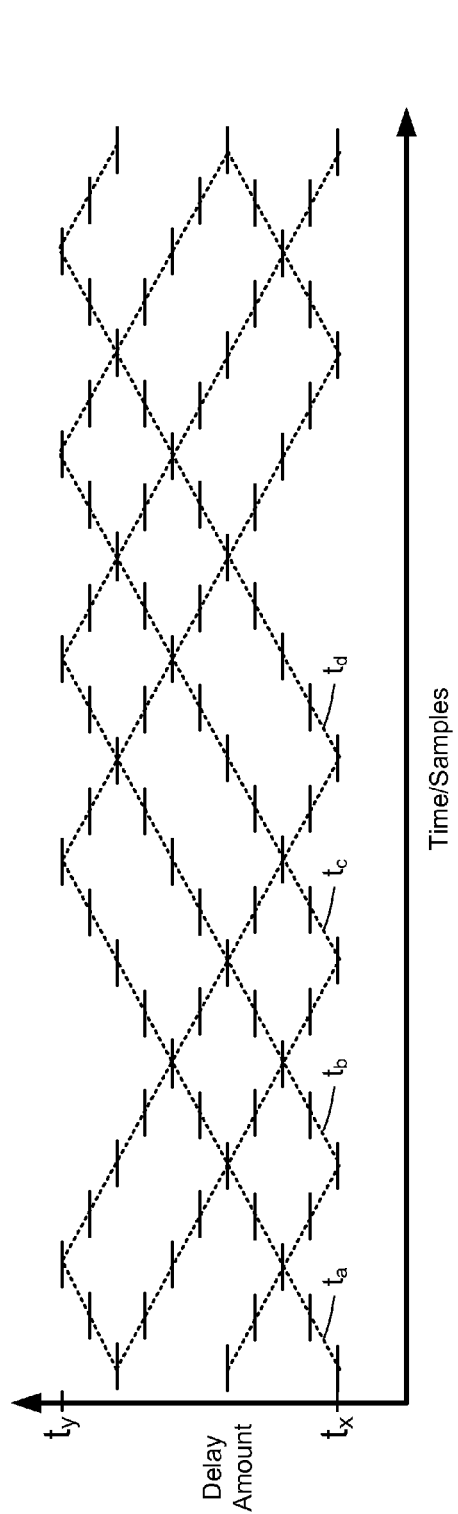
FIG. 3 is a graph illustrating an example of how multiple far-end audio signals may be delayed in an AEC environment.

FIG. 3 shows a more general example of cyclically varying delay values in a multi-channel system that uses more than two far-end signals. Specifically, this example illustrates how delay values may be varied for four far-end signals. The same techniques may be used for any number of received far-end audio signals.

For purposes of illustration, a dashed line has been drawn through the stepped values of four delays $t_a$, $t_b$, $t_c$, and $t_d$, corresponding respectively to four received far-end audio signals. Each dashed line forms a periodic, triangular waveform that cyclically ramps upward from a lower limit $t_x$ to an upper limit $t_y$, and then back from the upper limit $t_y$ to the lower limit $t_x$. Thus, the delay value of a particular far-end audio signal is varied in a repeating and oscillating cycle between the upper limit $t_y$ and the lower limit $t_x$. In the general case of N far-end audio signals, the delay cycles applied to the respective far-end audio signals are timed so that they are out of phase with each other.

In one implementation, out of phase delay value cycles may be established by varying each delay value in a similar manner, but starting out with each delay value at a different value. As an example, assume $d=(t_y-t_x)/(N-1)$. The initial delay of each signal channel 1 through N in this case may be as follows:

| Signal: | 1 | 2 | 3 | ... | N |
|---|---|---|---|---|---|
| Initial Delay: | 0d | 1d | 2d | ... | (N-1)d |

The initial delays calculated in this manner may be discretized to match the discretized delay values implemented by the variable delays 116(*a*) and 116(*b*).

Figure 4:
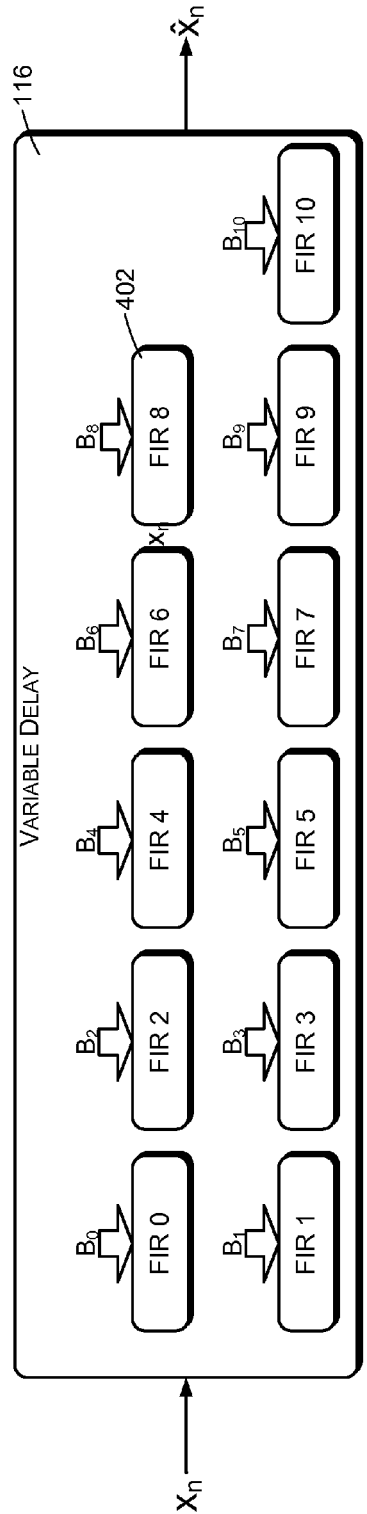
FIG. 4 is a block diagram illustrating an example of a variable delay element such as may be used in the environment of FIG. 1.

FIG. 4 shows an example implementation of a variable delay component 116. The variable delay component 116 comprises a bank of multiple linear FIR filters 402, each of which has corresponding filter coefficients $B_n$. For an $N^{th}$ order FIR filter, the coefficients $B_n$ are $b_0, b_1, \ldots b_{n-1}$, corresponding respectively to the N taps of the FIR filter. The filters are configured to be selectively applied to a far-end audio signal $x_n$ and to produce a delayed far-end audio signal $\hat{x}_{an}$. The FIR filters 402 have coefficients that are calculated to delay the far-end audio signal $x_n$ by respectively different amounts.

In this example, the variable delay 116 has 11 FIR filters 402, which correspond to fractional delays of 0 to 1 samples, in step sizes of 0.1. Specifically, the delays are the following fractions of the sample period: 0.0, 0.1, 0.2, 0.3, 0.4, 0.5, 0.6, 0.7, 0.8, 0.9, and 1.0.

The coefficients for each FIR filter may be calculated using the Lagrange polynomial to produce the desired fractional delay. For example, a classical Lagrange interpolator may be used as follows.

The Lagrange P(t) is a linear combination of the values x(k):

$$P(t) = \sum_{k=K-1}^{K} q_k(t)x(k)$$

where in this context K is the order of the desired filters, t corresponds to the desired delays µ, i.e., 0, 0.1, 0.2, ... 1.0, and $q_k(t)$ represents the Lagrange coefficients.

In order to obtain interpolated values in the central interval $0 \le t \le 1$, set t=µ. A $5^{th}$ order Lagrange interpolator is as follows for coefficients $q_{-2}$ through $q_3$:

$$q_{-2} = \tfrac{1}{120}(\mu^5 - 5\mu^4 + 5\mu^3 + 5\mu^2 - 6\mu)$$

$$q_{-1} = \tfrac{1}{24}(\mu^5 - 4\mu^4 - \mu^3 + 16\mu^2 - 12\mu)$$

$$q_0 = \tfrac{1}{12}(\mu^5 - 3\mu^4 - 5\mu^3 + 15\mu^2 + 4\mu - 12)$$

$$q_1 = \tfrac{1}{12}(\mu^5 - 2\mu^4 - 7\mu^3 + 8\mu^2 + 12\mu)$$

$$q_2 = \tfrac{1}{24}(\mu^5 - \mu^4 - 7\mu^3 + \mu^2 + 6\mu)$$

$$q_3 = \tfrac{1}{120}(\mu^5 - 5\mu^3 + 4\mu)$$

The order N of the FIR filters is selected based on the requirements of the particular application. Smaller order filters (such as $3^{rd}$ order or $5^{th}$ order filters) may be used if high frequency attenuation is not a concern. Otherwise, $7^{th}$ order or higher filters may be used. Step size is similarly selected based on the requirements of the particular application. Smaller step sizes may be used to reduce audible artifacts such as "clicks" that may occur when stepping between delay values. In the example 48 KHz environment described herein, $7^{th}$ order FIR filters are used, with step sizes that are less than or equal to 10% of the sample period.

Figure 5:
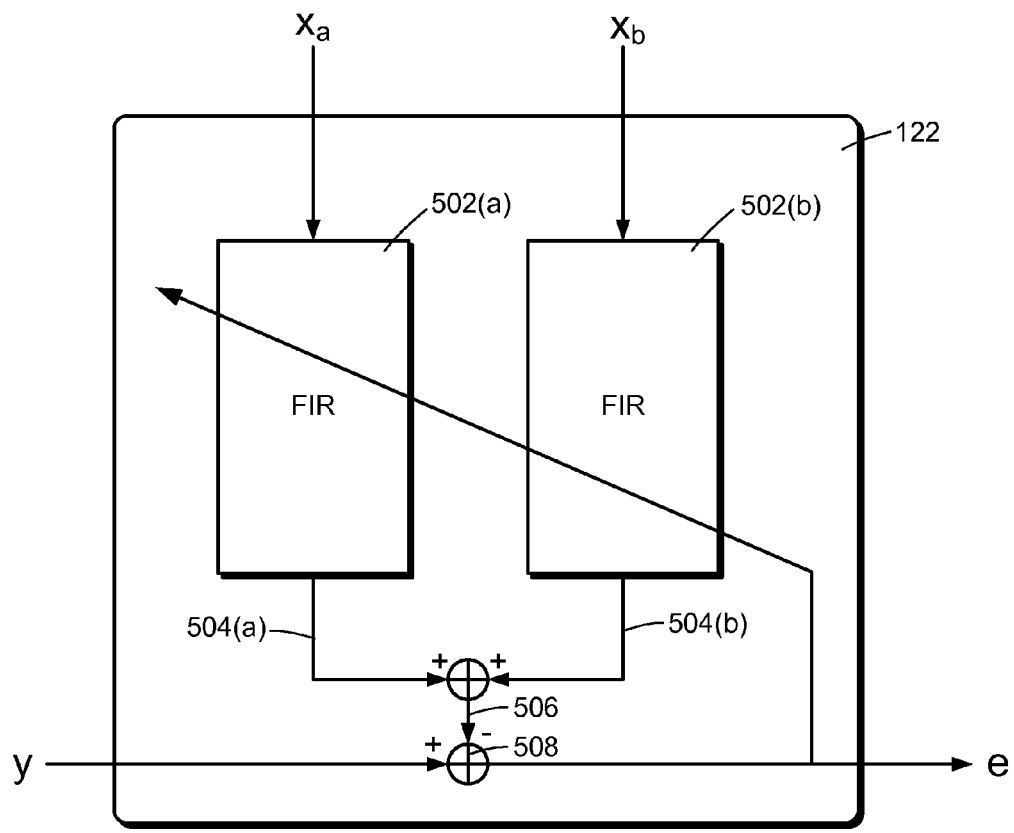
FIG. 5 is a block diagram illustrating an example of a stereo acoustic echo cancellation component such as may be used in the environment of FIG. 1.

FIG. 5 shows an example of a stereo AEC component 122. The AEC component 122 receives a near-end output audio signal y and outputs an echo-cancelled output audio signal e. In the AEC environment, the echo-cancelled output audio signal e is also referred to as an "error" signal.

The stereo AEC component 122 comprises a pair of adaptive finite impulse response (FIR) filters 502(*a*) and 502(*b*). The first adaptive FIR filter 502(*a*) receives the first far-end audio signal $x_a$, which is used as a reference signal to estimate echo components of the first audio channel. The second adaptive FIR filter 502(*b*) receives the second far-end audio signal $x_b$, which is used as a reference signal to estimate echo components of the second audio channel.

The first adaptive FIR filter 502(*a*) generates an estimated interference signal 504(*a*), which represents estimated components of the far-end audio that are present in the near-end output audio signal y, based on the first far-end audio signal $x_a$. The second adaptive FIR filter 502(*b*) generates an estimated interference signal 504(*b*), which represents estimated components of the far-end audio that are present in the near-end output audio signal y, based on the second far-end audio signal $x_b$. The estimated interference signals 504(*a*) and 504(*b*) are summed to produce a summed interference signal 506. A subtraction component 508 subtracts the summed interference signals 504(*a*) and 504(*b*) from the near-end output audio signal y to form the echo-cancelled output audio signal e.

Each adaptive FIR filter 502 estimates echo components of the near-end output audio signal y by generating and repeatedly updating its coefficients so as to continuously and adaptively minimize the signal power of the error signal e. Optimization of the filter coefficients may be performed by an adaptation controller (not shown) using a normalized least mean square algorithm or a total least square algorithm.

Figure 6:
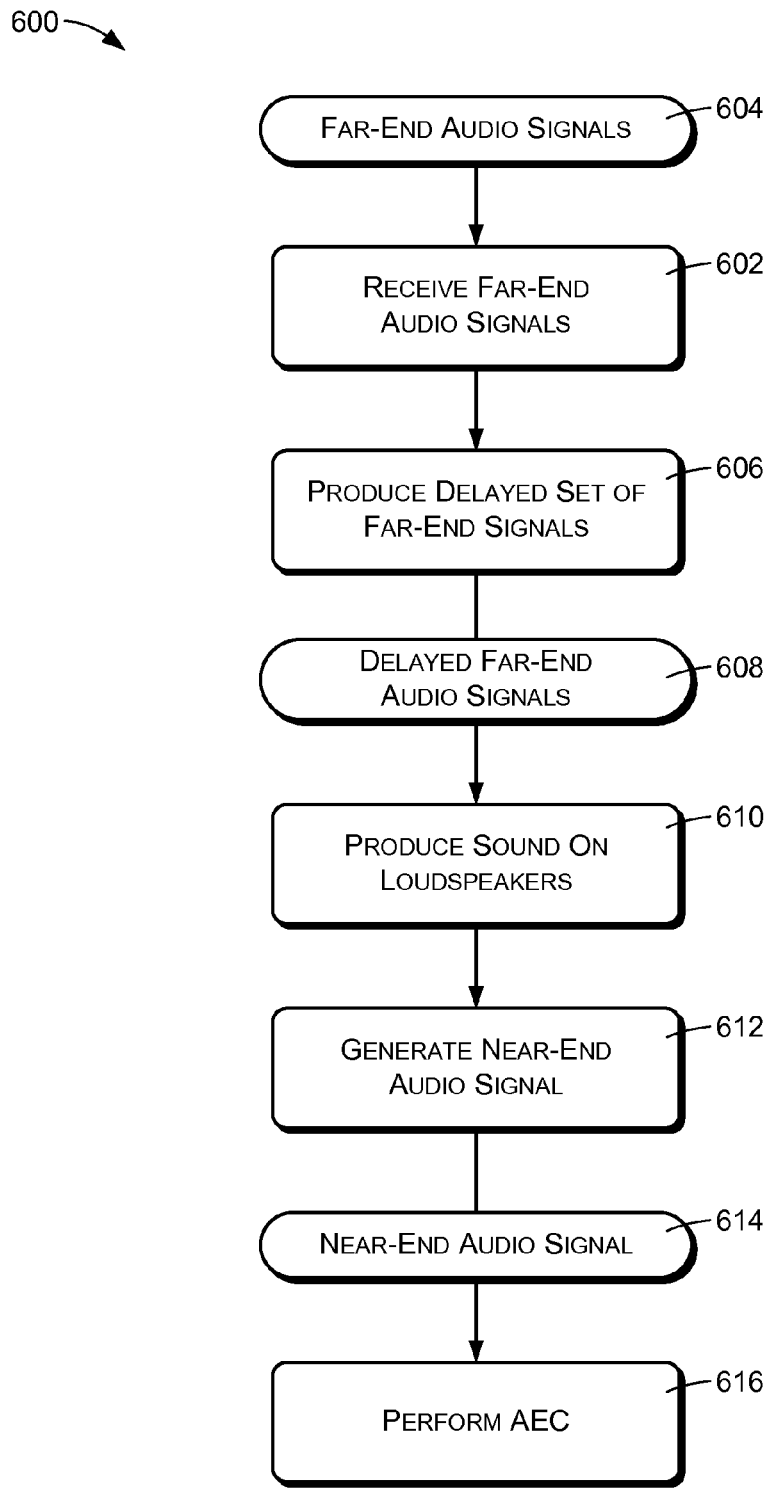
FIG. 6 is a flow diagram illustrating an example process that may be used to process input and output signals and to perform acoustic echo cancellation.

FIG. 6 illustrates an example method 600 that may be used in multi-channel telecommunication systems such as teleconferencing or videoconferencing systems. For example, a system may provide multi-channel audio communications between a far-end site and a near-end site, in which each site has multiple microphones and loudspeakers. For purposes of clarity, the system may at times be described as a two-channel or stereo system, in which each of the sites has two microphones and two loudspeakers. However, the described actions may be performed more generally with respect to an N-channel system, in which each site has a number N of microphones and loudspeakers.

An action 602 comprises receiving a set of far-end audio signals 604, which are also referred to herein as far-end input audio signals. Each far-end audio signal 604 represents far-end sound received by a respective microphone at the far-end site, wherein the far-end microphones are at different positions relative to each other and relative to a far-end source of the far-end sound. Each audio signal 604 may be a digital signal, in which the far-end sound is represented by a sequence of digital sample values, also referred to herein as signal values. The signal values represent the far-end sound at a given audio sample frequency or rate and correspond individually to respective sample periods. Each signal value represents the sound that occurs at a corresponding time that is dictated by the sample or signal frequency.

In an audio or video conferencing environment, the far-end sound may be produced by a far-end conference participant at the far-end site. Because the far-end audio signals represent sound from a common sound source, the audio signals 604 are highly or at least partially correlated with each other.

An action 606 comprises producing a delayed set of far-end audio signals 608, by delaying the far-end audio signals 604 in differently phased cycles. More specifically, the action 606 comprises delaying each of the far-end audio signals 604 by a respective variable delay amount and stepping or adjusting the variable delay amounts upwardly and then downwardly in respective cycles, wherein the delay cycles corresponding to the respective far-end audio signals 608 are out of phase with each other. The variable delay amounts are cyclically stepped upwardly and downwardly by one or more step or adjustment amounts, wherein at least some of the adjustment amounts are smaller than or a fraction of the sample period of the far-end audio signals 604. In the described examples, a common fractional adjustment amount is used for all delay steps and for all audio signals.

The action 606 may comprise oscillating or producing an oscillation of each delay amount through a corresponding range of delay amounts, wherein the oscillations of the delay amounts have phase offsets relative to each other and each range of delay amounts is defined by an upper limit and a lower limit. Examples of this are shown in FIGS. 2 and 3. In each oscillation, the delay amount is stepped upwardly and then downwardly between lower and upper limits of a delay interval or range. In some cases, a common delay interval or range of delay amounts range may be used for all of the far-end audio signals 604. In other cases, different intervals or ranges may be used for different ones of the far-end audio signals 604. The sizes or widths of the ranges may similarly be the same or may be different with respect to each other. In described embodiments, the delay values are stepped through ranges that are at least as wide as a full sample period, in at least 10 fractional steps.

In the example of a stereo communication system, the action 606 may comprise variably delaying one or both of the far-end audio signals 604. When both of the stereo far-end audio signals are delayed, the respective delay amounts are oscillated in opposition to each other, such as in opposing or opposite cycles. That is, the delay amounts are varied in oscillations that are 180 degrees out of phase with each other.

As discussed above, the action 606 may comprise selectively applying one or more fractional FIR filters to each of the far-end audio signals 604, wherein the one or more fractional FIR filters receives the far-end audio signal 604 and produce a corresponding delayed audio signal 608. The delayed audio signal 608 comprises a delayed representation of the sound represented by the corresponding far-end audio signal, wherein the delayed representation of the sound is delayed by a delay amount relative to the representation of the sound by the corresponding far-end audio signal.

Each FIR filter works by calculating a delayed signal value corresponding to each signal value of a far-end audio signal. While the signal value of the far-end audio signal represents sound at a particular point in time, the corresponding delayed signal value represents the sound at a preceding point in time. Because the introduced delay is fractional, the preceding point in time may comprise a time that is between times represented by individual signal values.

An action 610 comprises playing or rendering the delayed far-end audio signals 608 through respective loudspeakers at the near-end site, thereby producing sound from or based on the far-end audio signals. Because of the variable delay introduced into the far-end audio signals, the sound produced by the loudspeakers is less correlated than the sound represented by the original far-end audio signals 604. That is, the correlation between the sound produced by the loudspeakers has been reduced because of the out-of-phase delay cycles introduced into the far-end audio signals.

An action 612 comprises producing or generating a near-end audio signal 614, also referred to herein as an output audio signal, using a microphone at the near-end site. The near-end audio signal represents near-end sound received by the near-end microphone. The near-end sound includes (a) sound produced by a near-end conference participant at the near-end site and (b) far-end sound produced by the near-end loudspeakers.

An action 616 comprises performing AEC on the near-end audio signal 614 to at least partially cancel the far-end sound from the near-end audio signal 614. More specifically, the action 616 comprises processing the near-end audio signal with an acoustic echo canceller to at least partially cancel the sound produced by the near-end loudspeakers from the near-end audio signal 614. The acoustic echo canceller uses as references signals either the received far-end audio signals 604 or the delayed set of far-end audio signals 608.

Figure 7:
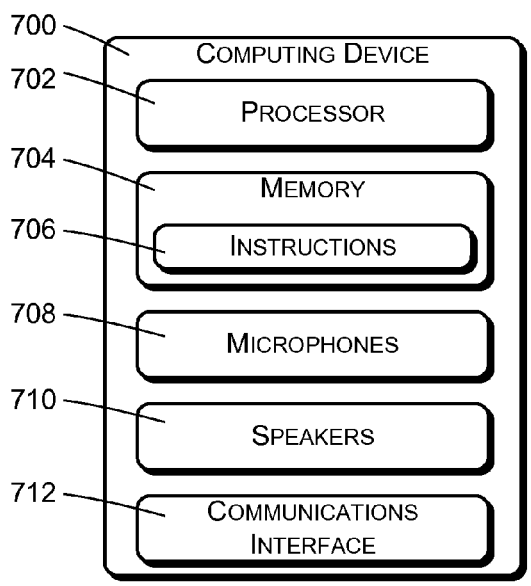
FIG. 7 is a block diagram of an example computing device that may be used to implement the techniques described herein.

FIG. 7 shows relevant components of a computing device 700 that may be configured to implement the techniques described herein. In some embodiments, the computing device 700 may comprise or may be part of a teleconferencing or videoconferencing system. The device 700 may comprise a single unit or may comprise parts or components that are located throughout a room or other environment. In the described embodiments, computing devices such as the computing device 700 may be used to implement the near-end system 102 and the far-end system 104.

The computing device 700 has a processor 702 and memory 704. The processor 702 may include multiple processors, or a processor having multiple cores. The processor 702 may comprise or include various different types of processors, including digital signal processors, graphics processors, etc.

The memory 704 may contain applications and programs in the form of computer-executable instructions 706 that are executed by the processor 702 to perform acts or actions that implement the methods and functionality described above. The memory 704 may be a type of non-transitory computer-readable storage media and may include volatile and non-volatile memory. Thus, the memory 704 may include, but is not limited to, RAM, ROM, EEPROM, flash memory, or other memory technology. The memory 704 may also include types of memory that are commonly used to transfer or distribute programs or applications, such as CD-ROMs, DVDs, thumb drives, portable disk drives, and so forth.

The computing device 700 may include one or more microphones 708 and one or more loudspeakers 710. The microphone 708 may be used to generate audio signals representing sound within the environment of the computing device 700. The loudspeakers 710 may be used to produce sound within the environment.

Although not shown, additional hardware such as amplifiers, digital-to-analog converters, analog to digital converters, and so forth may be used by the computing device 700 in conjunction with the microphones 708 and loudspeakers 710.

The computing device 700 also has a communications interface 712 such as a wireless networking interface for communicating with other similar devices for audio conferencing and other audio communications. The communications interface 712 may comprise a Wi-Fi or IEEE 802.11 interface, as one example. As another example, the communications interface 712 may comprise a wireless cellular communications interface. As yet another example, the communications interface 712 may comprise a Bluetooth interface. Communications between different computing devices 700 may be through various types of communication channels, including wired and wireless channels, private communications networks, public communications networks such as the Internet, point-to-point communication channels, etc.

The computing device 700 may of course include many other components that are not shown, such as indicators, graphical user interfaces, cameras, graphical displays, buttons and other types of user controls, sensors, transducers, electronic components, etc., depending on desired functionality and capabilities.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method for audio conferencing between a near-end site and a far-end site, comprising:

receiving first and second far-end audio signals, wherein the first far-end audio signal comprises a representation of first sound received by a first microphone at the far-end site and the second far-end audio signal comprises a representation of second sound received by a second microphone at the far-end site, the first sound and the second sound being produced by a far-end conference participant at the far-end site, each of the first and second far-end audio signals comprising a sequence of signal values corresponding to an audio sample rate, the audio sample rate corresponding to a sample period;

producing a first delayed audio signal having signal values corresponding respectively to the signal values of the first far-end audio signal, the first delayed audio signal comprising a delayed representation of the first sound, the delayed representation of the first sound being delayed by a first delay amount relative to the representation of the first sound by the first far-end audio signal;

producing a second delayed audio signal having signal values corresponding respectively to the signal values of the second far-end audio signal, the second delayed audio signal comprising a delayed representation of the second sound, the delayed representation of the second sound being delayed by a second delay amount relative to the representation of the second sound by the a second far-end audio signal;

oscillating the first delay amount, using one or more first finite impulse response (FIR) filters, between lower and upper limits by a step amount, wherein the step amount is a fraction of the sample period;

oscillating the second delay amount, using one or more second FIR filters, between the upper and lower limits by the step amount in opposition to the oscillating of the first delay amount;

producing the delayed representation of the first sound using a first loudspeaker, wherein the first loudspeaker is at the near-end site;

producing the delayed representation of the second sound using a second loudspeaker, wherein the second loudspeaker is at the near-end site;

producing a near-end audio signal using a near-end microphone, the near-end microphone being at the near-end site, wherein the near-end audio signal represents near-end sound comprising (a) sound produced by a near-end conferencing participant at the near-end site, (b) the delayed representation of the first sound produced using the first loudspeaker, and (c) the delayed representation of the second sound produced using the second loudspeaker; and processing the near-end audio signal with an acoustic echo canceller to at least partially cancel the delayed representations of the first and second sounds from the near-end audio signal based at least in part on the first far-end audio signal and the second audio signal.

2. The method of claim 1, wherein:

each signal value of the first far-end audio signal represents the first sound at a corresponding time; and producing the first delayed audio signal comprises, for a particular signal value of the first far-end audio signal, calculating a corresponding signal value of the first delayed audio signal, wherein the corresponding signal value of the first delayed audio signal represents the first sound at a time that precedes the corresponding time of the particular signal value.

3. The method of claim 1, wherein processing the near-end audio signal with the acoustic echo canceller comprises:

producing a first interference signal representing an estimated component of the first far-end audio signal that is present in the near-end audio signal;

producing a second interference signal representing an estimated component of the second far-end audio signal that is present in the near-end audio signal; and subtracting the first and second interference signals from the near-end audio signal.

4. A system comprising:

a first delay element configured to receive a first input audio signal and to produce a first delayed audio signal, wherein the first delayed audio signal is delayed relative to the first input audio signal by a first delay amount;

a second delay element configured to receive a second input audio signal and to produce a second delayed audio signal, wherein the second delayed audio signal is delayed relative to the second input audio signal by a second delay amount;

the system being configured to play the delayed first delayed audio signal and the second delayed audio signal on one or more loudspeakers to produce sound;

control logic configured to (a) produce a first oscillation of the first delay amount, using one or more first finite impulse response (FIR) filters, through a first range of delay amounts by one or more first adjustment amounts that are smaller than a sample period of the first input audio signal and (b) produce a second oscillation of the second delay amount, using one or more second FIR filters, through a second range of delay amounts by one or more second adjustment amounts that are smaller than a sample period of the second input audio signal, wherein first and second oscillations have a phase offset relative to each other;

an acoustic echo canceller configured to:
produce a first interference signal representing an estimated component of the first input audio signal that is present in an output signal;
produce a second interference signal representing an estimated component of the second input audio signal that is present in the output audio signal;
produce a summed interference signal from the first interference signal and the second interference signal; and
at least partially cancel a representation of the produced sound from the output audio signal by removing the summed interference signal from the output audio signal, wherein the acoustic echo cancellation uses as references (a) at least one of the first input audio signal and the first delayed audio signal and (b) at least one of the second input audio signal and the second delayed audio signal.

5. The system of claim 4, wherein the first and second ranges are equal to each other.

6. The system of claim 4, wherein the phase offset is 180 degrees.

7. The system of claim 4, wherein the acoustic echo canceller comprises:
a first adaptive finite impulse response (FIR) filter configured to produce the first interference signal;
a second adaptive FIR filter configured to produce the second interference signal; and
a subtraction component configured to perform the removing of the summed interference signal from the output audio signal.

8. The system of claim 4, further comprising a microphone and the loudspeakers, wherein the microphone is configured to produce the output audio signal.

9. The system of claim 1, wherein at least one of the one or more first FIR filters has an order of at least seven and one or more first adjustment amounts are less than or equal to 10% of the sample period of the first input audio signal.

10. The system of claim 4, wherein the one or more first FIR filters comprise multiple FIR filters are configured to delay the first input audio signal by respectively different amounts.

11. The system of claim 4, wherein:
the first input audio signal comprises a sequence of signal values, each signal value representing first sound at a corresponding time; and
the first delay element is configured to calculate a delayed signal value corresponding to one of the signal values of the first input audio signal, wherein the delayed signal value represents the first sound at a time that precedes the corresponding time of the one of the signal values.

12. A method comprising:
receiving a first set of audio signals that are at least partially correlated, wherein each audio signal of the first set comprises a sequence of signal values, and each signal value corresponds to a sample period;
producing a second set of audio signals that correspond respectively to the audio signals of the first set, wherein producing the second set of audio signals comprises delaying a first of the audio signals of the first set by a first delay amount relative to one or more others of the first set of audio signals;
producing a first oscillation of the first delay amount through a range of delay amounts, using one or more finite impulse response (FIR) filters, by one or more adjustment amounts that are smaller than the sample period;
producing sound from the second set of audio signals;
producing an output audio signal representing the sound;
producing a first interference signal and a second interference representing an estimated component of the first set of audio signals that are present in the output signal;
producing a summed interference signal from the first interference signal and the second interference signal; and
performing acoustic echo cancellation on the output signal to at least partially cancel a representation of the sound from the output audio signal by removing the summed interference signal from the output audio signal.

13. The method of claim 12, wherein the acoustic echo cancellation uses multiple audio signals of at least one of the first set or the second set as references.

14. The method of claim 12, wherein the audio signals of the first set represent sound received by microphones at different positions relative to a sound source.

15. The method of claim 12, wherein producing the sound comprises producing the sound on respective loudspeakers.

16. The method of claim 12, wherein producing the output audio signal uses a microphone that receives the sound.

17. The method of claim 12, wherein delaying the first audio signal of the first set comprises:
selecting one of one or more FIR filters corresponding to the delay amount; and
processing the first audio signal of the first set with the selected FIR filter.

18. The method of claim 12, wherein:
producing the second set of audio signals comprises delaying a second of the audio signals of the first set by a second delay amount relative to one or more others of the first set of audio signals;
the method further comprising producing a second oscillation of the second delay amount through a range of delay amounts by one or more adjustment amounts that are smaller than the sample period; and
the first and second oscillations have a phase offset relative to each other.

19. The method of claim 1, wherein the one or more first FIR filters are different than the one or more second FIR filters or the one or more first FIR filters are the same as the one or more second FIR filters such that the one or more first FIR filters oscillate the second delay amount between the upper and lower limits by the step amount in opposition to the oscillating of the first delay amount.

20. The method of claim 1, wherein the first delay amount and the second delay amount are within a delay range having a lower limit of 1.0 T and an upper limit of 2.0 T, where T is a sample period.

* * * * *